United States Patent
Camenisch (10) Patent No.: US 8,122,245 B2
(45) Date of Patent: *Feb. 21, 2012

(54) ANONYMITY REVOCATION

(75) Inventor: Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 12/167,488

(22) Filed: Jul. 3, 2008

(65) Prior Publication Data

US 2008/0276084 A1 Nov. 6, 2008

Related U.S. Application Data (63) Continuation of application No. 11/137,246, filed on May 25, 2005, now Pat. No. 7,581,107.

(30) Foreign Application Priority Data

May 28, 2004 (EP) .................... 04405331

(51) Int. Cl.
H04L 29/06 (2006.01)
(52) U.S. Cl. ........ 713/156; 380/278; 713/155; 713/180; 713/182
(58) Field of Classification Search .................. 380/278; 713/155, 156, 180, 182
See application file for complete search history.

(56) References Cited

U.S. PATENT DOCUMENTS

| | | | |
|---|---|---|---|
| 2002/0004900 A1* | 1/2002 | Patel | 713/155 |
| 2002/0038291 A1* | 3/2002 | Petersen et al. | 705/67 |
| 2003/0190046 A1* | 10/2003 | Kamerman et al. | 380/286 |
| 2003/0195857 A1* | 10/2003 | Acquisti | 705/74 |
| 2009/0019285 A1* | 1/2009 | Chen et al. | 713/175 |

* cited by examiner

*Primary Examiner* — Vivek Srivastava
*Assistant Examiner* — Hee Song
(74) *Attorney, Agent, or Firm* — Michael J. Buchenhorner; Vazken Alexanian (57) ABSTRACT

Methods and systems for anonymity revocation, enabling a trusted entity to identify a user computer within an anonymous system. A system comprises an attester computer providing attestation value cert from a security module public key and an identifying value. The user computer having a module providing the module public key and a security module attestation value, the user computer providing a user public key, a user attestation-signature value derived from the attestation value cert, and an encryption computable under use of a trusted-entity public key and a module-generated-identifier value, the module-generated-identifier value relating to the identifying value; a verification computer verifying validity of received user attestation-signature value and the encryption; and a trusted entity having a trusted entity secret key, wherein the trusted entity is able to derive the module-generated-identifier value from the encryption, the module-generated-identifier value being usable to identify the user computer with the security module.

19 Claims, 3 Drawing Sheets

ANONYMITY REVOCATION

This application is a continuation of, and claims priority from, U.S. patent application Ser. No. 11/137,246, filed on May 25, 2005, now U.S. Pat. No. 7,581,107. U.S. Pat. No. 7,581,107 is a U.S. National Application of International Application No. EPO 04405331.2 (filed on May 28, 2004), of which the benefit of the priority filing date is claimed and which is hereby incorporated by reference in its entirety.

TECHNICAL FIELD

The present invention is related to a method and network for enabling a trusted entity to identify a user computer with a security module. Anonymity is revocable in predefined circumstances by the trusted entity within an otherwise anonymous system.

BACKGROUND OF THE INVENTION

Computers have evolved to tools for many applications and services. In today's world a trustworthy computing environment becomes more and more a desire. Comprehensive trust, security, and privacy functions are required to establish multi-party trust between devices, upon which content providers, application and service providers, consumers, enterprises and financial institutions, and particularly users can rely.

For that, a trusted platform module (TPM) has been established. The role of the module is to offer protected storage, platform authentication, protected cryptographic processes and attestable state capabilities to provide a level of trust for the computing platform. The foundation of this trust is the certification by a recognized authority that the platform can be trusted for an intended purpose. A so-called trusted computing group (TCG) will further develop and promote open industry standard specifications for trusted computing hardware building blocks and software interfaces across multiple platforms, including PC's, servers, PDA's, and digital phones. This will enable more secure data storage, online business practices, and online commerce transactions while protecting privacy and individual rights. Users will have more secure local data storage and a lower risk of identity theft from both external software attack and physical theft.

To realize the functionality of attestable states, an issuer issues a certificate to the trusted platform module, hereafter also abbreviated as TPM, as to allow the TPM to later prove that it is a genuine TPM and therefore a verifying party can have confidence stated attested by the TPM. To allow the TPM to prove it is genuine without that the verifying party can identify the TPM, a so-called direct anonymous attestation (DAA) protocol has been specified by the trusted computing group. The protocol allows the TPM to convince a verifying party that it obtained attestation by an issuer without revealing its identity.

Further, the TCG specified a protocol to provide attestation (with a certificate) to a platform's TPM such that the platform can later prove to any party that it preserved attestation without that the verifying party can identify the platform or link this proof of attestation with other proofs of attestation that the platform provided.

In many cases, complete anonymity is not appropriate, as it can be misused. Thus, a balance between privacy requirements of honest users and requirements of law enforcement should be found. This leads inevitably to a compromise that should be acceptable.

The attestation procedure however does not allow retrieving the identity of a TPM.

From the above it follows that there is still a need in the art for an improved protocol and system which allow a revocation of anonymity within an anonymous system.

GLOSSARY

The following are informal definitions to aid in the understanding of the description.
TPM—trusted platform module or security module
$ID_{TPM}$—identifying value
Nv, $ID'_{TPM}$—module-generated-identifier value
cert—attestation value with values A, e, v"
DAA'—user attestation-signature value
DAA[C]—first part of the user attestation-signature value
E—encryption
E'—encryption proof value
R—encryption random values
R'—encryption proof random values
C'—intermediate user attestation-signature value
C"—first verification value
$PK_{UC}$—user public key
$PK_{TPM}$—security module public key
$PK_{AC}$—attester public key with values $n,g,g',h,S,Z,R_0,R_1,\Gamma,\gamma,\rho$
$PK_J$—trusted entity public key
$SK_J$—trusted entity secret key
A—first part of attestation value cert
e—second part of attestation value cert, being a random prime
v"—third part of attestation value cert, being a random integer
m—decryption policy
U—part of public key of security module $PK_{TPM}$
z—base value
C, sf0, sf1, sv—proof values
$T_1$—part of user attestation-signature value DAA'
$T'_1$—first signature value, or first security module attestation value
$T''_1$—intermediary user attestation-signature value
$T'''_1$—intermediary user attestation-signature verification value

SUMMARY AND ADVANTAGES OF THE INVENTION

In the following are provided systems, apparatus and methods which allow a designated trusted party or trusted entity to reveal which computer with security module, also referred to as TPM, performed an anonymous proof of attestation. More precisely, the trusted entity can reveal an identifier that the TPM produced when the TPM got attestation.

In accordance with the present invention, there is provided a network for enabling identification of a user computer having a security module by a trusted entity. In other words, the network allows revoking of anonymity by the trusted entity within an otherwise anonymous system. The network comprises an attester computer that provides an attestation value cert from a security module public key $PK_{TPM}$ and an identifying value $ID_{TPM}$; the security module of the user computer is adapted to provide the module public key $PK_{TPM}$ and a security module attestation value DAA, the user computer providing a user public key $PK_{UC}$, a user attestation-signature value DAA' derived from the attestation value cert, and an encryption E computable under use of a trusted-entity public key $PK_J$ and a module-generated-identifier value $ID'_{TPM}$, the module-generated-identifier value $ID'_{TPM}$ relating to the identifying value $ID_{TPM}$; a verification computer for verifying the validity of the received user attestation-signature value DAA' and the encryption E; and a trusted entity having a trusted entity secret key $SK_J$, wherein the trusted entity is able to derive the module-generated-identifier value $ID'_{TPM}$ from the encryption E, the module-generated-identifier value $ID'_{TPM}$ being usable to identify the user computer with the TPM.

In accordance with a further aspect of the present invention, there is provided a method enabling a trusted entity to identify a user computer having a security module within a system that usually is an anonymous system. That means, anonymity can be revoked by the trusted entity.

In accordance with another aspect of the present invention, there is provided a method for identifying a user computer with a security module by a trusted entity within a system. The system comprises further an attester computer and a verification computer.

In accordance with a yet a further aspect of the present invention, there is provided a method for verifying a user attestation-signature value DAA' by a verification computer within a system in which an identity of a user computer having a security module is identifiable, i.e., revealable, by a trusted entity. The system comprises further an attester computer.

In accordance with yet another aspect of the present invention there is provided a method for enabling identification of a user computer with a security module by a trusted entity within a system which further comprises an attester computer and a verification computer.

DESCRIPTION OF THE DRAWINGS

Advantageous embodiments of the invention are described in detail below, by way of example only, with reference to the following schematic drawings.

DETAILED DESCRIPTION OF EMBODIMENTS

The present invention provides apparatus, systems and methods which allow a designated trusted party or trusted entity to reveal which computer with security module, also referred to as TPM, performed an anonymous proof of attestation. More precisely, the trusted entity can reveal an identifier that the TPM produced when the TPM got attestation.

The present invention provides an example of a network for enabling identification of a user computer having a security module by a trusted entity. In other words, the network allows revoking of anonymity by the trusted entity within an otherwise anonymous system. The network comprises an attester computer that provides an attestation value cert from a security module public key $PK_{TPM}$ and an identifying value $ID_{TPM}$; the security module of the user computer is adapted to provide the module public key $PK_{TPM}$ and a security module attestation value DAA, the user computer providing a user public key $PK_{UC}$, a user attestation-signature value DAA' derived from the attestation value cert, and an encryption E computable under use of a trusted-entity public key $PK_J$ and a module-generated-identifier value $ID'_{TPM}$, the module-generated-identifier value $ID'_{TPM}$ relating to the identifying value $ID_{TPM}$; a verification computer for verifying the validity of the received user attestation-signature value DAA' and the encryption E; and a trusted entity having a trusted entity secret key $SK_J$, wherein the trusted entity is able to derive the module-generated-identifier value $ID'_{TPM}$ from the encryption E, the module-generated-identifier value $ID'_{TPM}$ being usable to identify the user computer with the TPM.

The present invention provides an example of a method enabling a trusted entity to identify a user computer having a security module within a system that usually is an anonymous system. That means, anonymity can be revoked by the trusted entity. The system further comprises an attester computer and a verification computer. The method performable by the user computer with the security module comprises the steps of (i) receiving from the attester computer an attestation value cert, the attestation value cert being derived from a security module public key $PK_{TPM}$ and an identifying value $ID_{TPM}$, (ii) deriving under use of the security module a user attestation-signature value DAA' from the attestation value cert, (iii) computing an encryption E by the user computer under use of a trusted-entity public key $PK_J$ and a module-generated-identifier value $ID'_{TPM}$, the module-generated-identifier value $ID'_{TPM}$ relating to the identifying value $ID_{TPM}$, and (iv) providing the user attestation-signature value DAA' and the encryption E to the verification computer for verification. The trusted entity having a trusted entity secret key $SK_J$ is able to derive the module-generated-identifier value $ID'_{TPM}$ from the encryption E. The module-generated-identifier value $ID'_{TPM}$ is then usable to identify the user computer with the security module. This has the advantage that one can be sure that the attester computer knows the module-generated-identifier value $ID'_{TPM}$ and can thus identify the user computer with TPM from this value.

The step of deriving the user attestation-signature value DAA' can further comprise receiving from the security module the module-generated-identifier value $ID'_{TPM}$ and deriving the encryption E and encryption random values R from the module-generated-identifier value $ID'_{TPM}$ under the use of the trusted-entity public key $PK_J$. This is more secure as the security module can insure that a correct value of the module-generated-identifier value $ID'_{TPM}$ will be encrypted.

The step of deriving can further comprise receiving from the security module a second module-generated-identifier value $ID'_{TPM}$ and deriving an encryption proof value E' and encryption proof random values R' from the second module-generated-identifier value $ID''_{TPM}$ under the use of the trusted-entity public key $PK_J$. This will allow the user computer to actually prove that the correct value of the module-generated-identifier value $ID'_{TPM}$ is encrypted in the encryption E. Thus, this is more secure for the verification computer which otherwise could not verify what the encryption E encrypts.

In addition, the step of deriving can further comprise deriving an intermediary user-attestation signature value C' from the encryption E and the encryption proof value E' under use of a hash function, providing the intermediate user attestation-signature value C' to the security module; receiving from the security module a first part of the user attestation-signature value DAA', and calculating by the user computer further parts of the user attestation-signature value DAA' by using the received first part of the user attestation-signature value DAA', the encryption random values R, the encryption proof random values R', the attester public key $PK_{AC}$ and the trusted-entity public key $PK_J$. This allows the user computer to convince the verification computer that the value encrypted in the encryption E is the value that the attester computer, i.e., the issuer, has embedded into the attestation value cert that being a certificate. When providing a service the user computer with the security module can be billed or charged when the trusted entity derived or was requested to derive the module-generated-identifier value $ID'_{TPM}$ from the encryption E, because then the derived module-generated-identifier value $ID'_{TPM}$ identifies the user computer with the security module.

The present invention also provides an example of a method tbr identifying a user computer with a security module by a trusted entity within a system. The system comprises further an attester computer and a verification computer. The method performable by the trusted entity comprises step steps of (a) providing a trusted-entity public key $PK_J$; (b) receiving an encryption E computed by the user computer under use of the trusted-entity public key $PK_J$, wherein the encryption comprises a module-generated-identifier value $ID'_{TPM}$ relating to an identifying value $ID_{TPM}$. The identifying value $ID_{TPM}$ was used together with a security module public key $PK_{TPM}$ by the attester computer to generate an attestation value cert. The user computer under use of the security module derived a user attestation-signature value DAA' from the attestation value cert. The method performable by the trusted entity further comprises the step (c) of deriving the module-generated-identifier value $ID'_{TPM}$ from the encryption E by applying a trusted entity secret key $SK_J$, the derived module-generated-identifier value $ID'_{TPM}$ being usable to identify the user computer with the security module.

The method can further comprise sending the derived module-generated-identifier value $ID'_{TPM}$ to the attester computer and in response to the sent derived module-generated-identifier value $ID'_{TPM}$ receiving the related identifying value $ID_{TPM}$ identifying the user computer with the security module. This will be advantageous in cases where the module-generated-identifier value $ID'_{TPM}$ allows not directly identifying the user computer with the TPM. As the attester computer knows which user computer with TPM has which value of the module-generated-identifier value $ID'_{TPM}$, the attester computer can help to identify the user computer with the respective TPM in such cases.

The present invention further provides an example of a method for verifying a user attestation-signature value DAA' by a verification computer within a system in which an identity of a user computer having a security module is identifiable, i.e., revealable, by a trusted entity. The system comprises further an attester computer. This method performable by the verification computer comprises the steps of (I) receiving the user attestation-signature value DAA' and an encryption E for verification, the encryption E having been computed by the user computer under use of a trusted-entity public key $PK_J$ and a module-generated-identifier value $ID'_{TPM}$ that relates to an identifying value $ID_{TPM}$ which together with a security module public key $PK_{TPM}$ was used by the attester computer to generate an attestation value cert, wherein the user computer under use of the security module derived the user attestation-signature value DAA' from the attestation value cert, wherein the trusted entity having a trusted entity secret key $SK_J$ is able to derive the module-generated-identifier value $ID'_{TPM}$ from the encryption E, the derived module-generated-identifier value $ID'_{TPM}$ being usable to identify the user computer with the security module; and (II) verifying the validity of the received user attestation-signature value DAA' and the encryption E.

The verification can comprise computing a first verification value C" by using the user attestation-signature value DAA', the attester public key $PK_{AC}$, the trusted-entity public key $PK_J$, the encryption E, and a hash-function, and checking whether or not the first verification value C" is comprised in the user attestation-signature value DAA'. This has the advantage that the verification computer can convince itself, i.e. verify, that the encryption E is an encryption under the attester public key $PK_{AC}$.

The present invention also provides an example of a method for enabling identification of a user computer with a security module by a trusted entity within a system which further comprises an attester computer and a verification computer. The method performable by the attester computer comprises the steps of (A) deriving an attestation value cert from a security module public key $PK_{TPM}$ and an identifying value $ID_{TPM}$; (B) providing the attestation value cert to the user computer which under use of the security module is able to derive a user attestation-signature value DAA' from the attestation value cert and to compute an encryption E under use of a trusted-entity public key $PK_J$ and a module-generated-identifier value $ID'_{TPM}$, the module-generated-identifier value $ID'_{TPM}$ relating to the identifying value $ID_{TPM}$, the user attestation-signature value DAA' and the encryption E being verifiable by the verification computer, wherein the trusted entity having a trusted entity secret key $SK_J$ is able to derive the module-generated-identifier value $ID'_{TPM}$ from the encryption E, the module-generated-identifier value $ID'_{TPM}$ being usable to identify the user computer with the security module. This has the advantage that the verification computer can convince itself or verify that the encryption E comprises one module-generated-identifier value $ID'_{TPM}$ that was embedded into the attestation value cert by the attester computer, i.e., thus the attester computer will know which user computer with TPM corresponds to the module-generated-identifier value $ID'_{TPM}$ that is comprised in the encryption E.

The user computer with the security module can be billed for the attestation value cert provided by the attester computer. The attestation value cert can relate to a particular service, such as a subscription or web service, and therefore be designed with a charge.

Further, the trusted entity can be billed for providing one identifying value $ID_{TPM}$ upon request. The attester computer hosts or stores the module-generated-identifier value $ID'_{TPM}$ as well as the identifying value $ID_{TPM}$ which relate to each other. Consequently, the attester computer can provide the real identity of the user computer with the security module to the trusted entity.

In accordance with the present invention, a direct anonymous attestation protocol involves an issuer, a trusted platform module (TPM), a host platform (host) with the TPM, and several verifiers. All communication of the TPM is performed via its host. The issuer issues an attestation to the host and the TPM together in such a way that when proving that attestation has been obtained, the host can only do so when involving the TPM, proving possession of an attestation can be done anonymously (or pseudonymously), i.e., such that no verifier can not link two different proofs (or proves with different verifiers can not be linked).

Thus, the attestation scheme comprises four procedures:

a "key generation" that allows the issuer to generate the public and secret keys of the attestation scheme;

a "join protocol" that is run between a host/TPM and the issuer and allows the host/TPM to obtain attestation;

a "sign procedure" that is run between a host and the TPM that allows them to anonymously prove that they got attestation and at the same time authenticating a message, the result of this prove is a signature that can be sent to a verifier; and a "verify procedure" that allows a verifier to check whether or not a platform got attestation and whether this platform authenticated a given message.

The following figures and descriptions show how anonymity can be revoked from the otherwise anonymous system by a trusted entity. This should be performable in predefined circumstances, e.g., where a criminal act is involved, where the national security is jeopardized, or where a suspicious communication is detected. The predefined circumstances can be given by rules or a decryption policy. The trusted entity can be a judge or a government institution or any other entity with respective power or trust.

Figure 1:
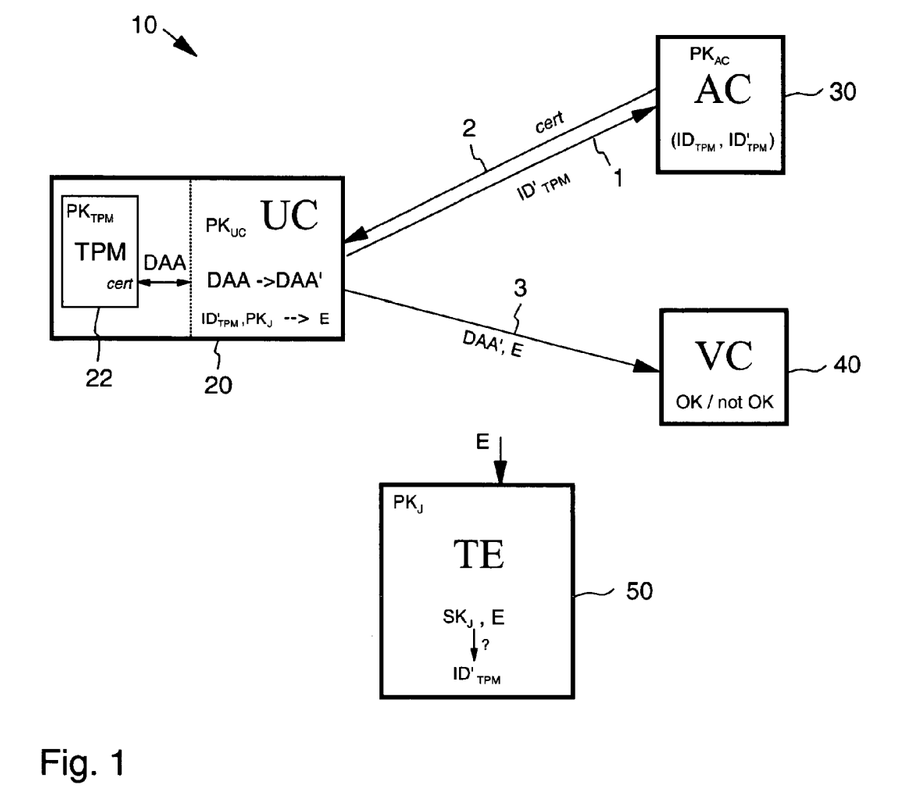
FIG. 1 shows a schematic illustration of a scenario with an attester computer, a user computer having a trusted platform module, and a verification computer, and a trusted entity.

FIG. 1 shows a schematic illustration of a network or an anonymous system 10 with an attester computer 30, also labeled with AC, a user computer 20 having a security module 22 which are labeled with UC and TPM, respectively, and a verification computer 40, labeled with VC. In addition, a trusted entity 50, labeled with TE, that is able to revoke anonymity is shown. The user computer 20 that represents the host platform (host) is connected to the attester computer 30, i.e. the issuer, and the verification computer 40, i.e. the verifier. The system allows to use a user attestation-signature value DAA'.

The TPM, i.e. the security module 22, provides a security module public key $PK_{TPM}$ while the user computer 20 further provides a user public key $PK_{UC}$. The security module 22 further provides a security module attestation value DAA. The attester computer 30 provides an attester public key $PK_{AC}$ and selects an identifying value $ID_{TPM}$ that corresponds or maps to a module-generated-identifier value $ID'_{TPM}$. The verification computer 40 can verify the validity of the user attestation-signature value DAA'. The trusted entity 50 provides a trusted-entity public key $PK_J$.

In operation, as indicated in the figure with arrow 1 and labeled with "$ID'_{TPM}$", the user computer 20 sends to the attester computer 30 its module-generated-identifier value $ID'_{TPM}$ as a request. The attester computer 30 chooses an identifying value $ID_{TPM}$ that corresponds or maps to the received module-generated-identifier value $ID'_{TPM}$. From the security module public key $PK_{TPM}$ and the identifying value $ID_{TPM}$ is then an attestation value cert derived by the attester computer 30. In return to the request the attester computer 30 sends back the attestation value cert, as indicated with arrow 2, labeled with "cert". The user computer 20 derives then the user attestation-signature value DAA' from the attestation value cert under use of the security module 22. The user computer 20 further computes an encryption E under use of a trusted-entity public key $PK_J$ and the module-generated-identifier value $ID'_{TPM}$. It becomes clear from the above that the module-generated-identifier value $ID'_{TPM}$ relates to the identifying value $ID_{TPM}$. The user computer 20 can then send the user attestation-signature value DAA' together with the encryption E, as indicated with arrow 3 and labeled with "DAA', E", to the verification computer 40 that then can initiate the verification procedure.

Only the trusted entity 50 having a trusted entity secret key $SK_J$ is able to derive the module-generated-identifier value $ID'_{TPM}$ from the encryption E. The module-generated-identifier value $ID'_{TPM}$ is usable to identify the user computer 20 with the security module 22, as indicated with FIG. 2.

Figure 2:
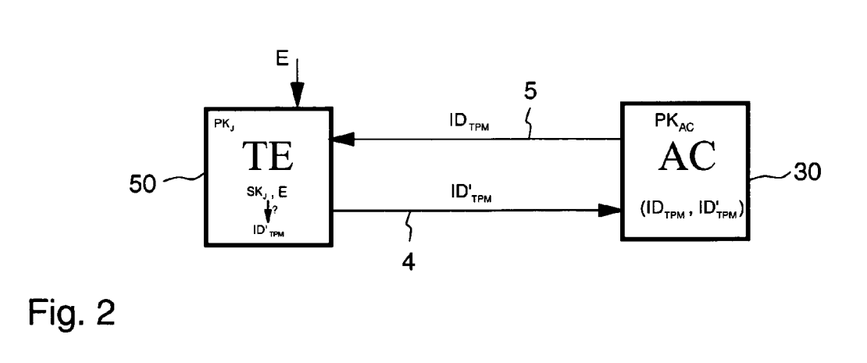
FIG. 2 shows a schematic flow between the trusted entity and the attester computer in order to identify the user computer with the respective identifying value.

FIG. 2 shows a schematic flow between the trusted entity 50 and the attester computer 30 in order to identify the user computer 20 with the respective identifying value $ID_{TPM}$. In a predefined case or circumstance, e.g., given by a policy, the trusted entity 50 derives from the encryption E under use of the trusted entity secret key $SK_J$ the module-generated-identifier value $ID'_{TPM}$ and sends this derived module-generated-identifier value $ID'_{TPM}$ as a reveal request, as indicated with arrow 4, to the attester computer 30. The attester computer 30 tries to map the received module-generated-identifier value $ID'_{TPM}$ and when the received module-generated-identifier value $ID'_{TPM}$ corresponds to one identifying value $ID_{TPM}$ the corresponding user computer 20 with security module 22 is identified. The reveal response indicating the respective user computer 20 with security module 22 is then returned to the trusted entity 50, as indicated with arrow 5, labeled with $ID_{TPM}$. Further actions can then be taken, such as revealing the user of the user computer 20 and taking appropriate actions against the user.

Figure 3:
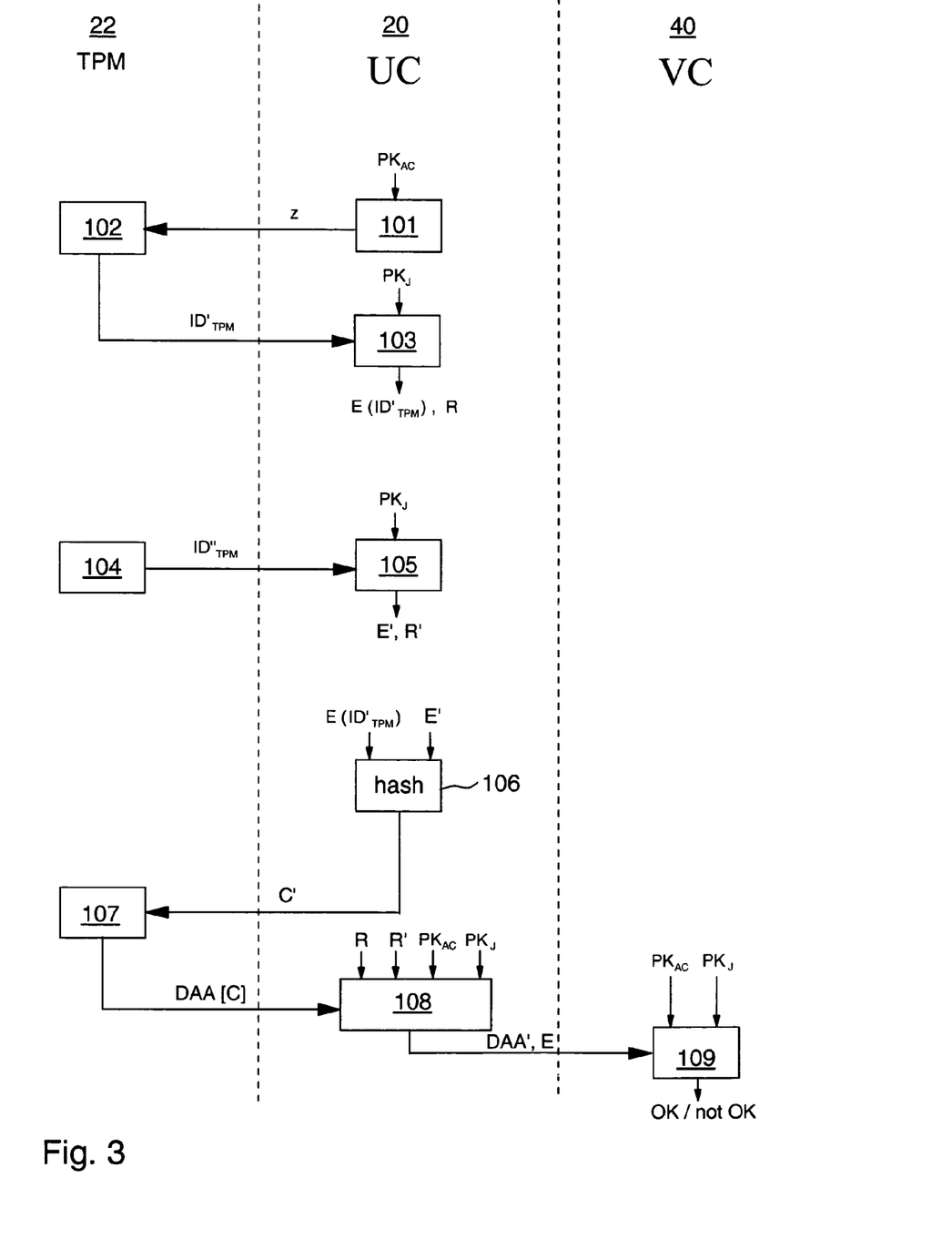
FIG. 3 shows a schematic flow for the generation of an encryption E and a user attestation-signature value DAA' and the verification of the encryption E and the user attestation-signature value DAA' involving the trusted platform module, the user computer, and the verification computer.

FIG. 3 shows a schematic flow for the generation of an encryption E and a user attestation-signature value DAA' and further the verification of the encryption E and the user attestation-signature value DAA' involving the trusted platform or security module 22, the user computer 20, and the verification computer 40. At first, in step 101 the user computer 20 generates from the attester public key $PK_{AC}$ a base value z and provides it to the security module 22. In step 102, the security module 22 transforms the base value z to a module-generated-identifier value $ID'_{TPM}$ and provides the module-generated-identifier value $ID'_{TPM}$ to the user computer 20. The user computer 20 computes then in step 103 an encryption $E(ID'_{TPM})$ and encryption random values R from the module-generated-identifier value $ID'_{TPM}$ under the use of the trusted-entity public key $PK_J$.

As further illustrated the security module 22 generates in step 104 a second module-generated-identifier value $ID''_{TPM}$ and provides the value to the user computer 20. The user computer 20 derives then in step 105 an encryption proof value E' and encryption proof random values R' from the module-generated-identifier value $ID'_{TPM}$ under the use of the trusted-entity public key $PK_J$.

Under use of a hash function, as indicated with step 106, an intermediary user-attestation signature value C' is derived from the encryption $E(ID'_{TPM})$ and the encryption proof value E'. When the security module 22 has received the intermediate user attestation-signature value C', a first part of the user attestation-signature value DAA[C] is generated and provided to the user computer 20. The user computer 20 calculates then further parts of the user attestation-signature value DAA' by using the received first part of the user attestation-signature value DAA[C], the encryption random values R, the encryption proof random values R', the attester public key $PK_{AC}$, and the trusted-entity public key $PK_J$.

With the computed encryption E and the calculated user attestation-signature value DAA', the user computer 20 can send a verification request, as also indicated with arrow 3 in FIG. 1, to the verification computer 40.

When the user computer 20 provides the user attestation-signature value DAA' and the encryption E to the verification computer 40, the validity of the received user attestation-signature value DAA' and the encryption E can be verified under use of the attester public key $PK_{AC}$ and the trusted-entity public key $PK_J$. The verification is described in more detail with reference to FIG. 4. As indicated with the output arrow from the verification step 109, it turns out either "OK" or "not OK", i.e., either the verification is valid or not.

Figure 4:
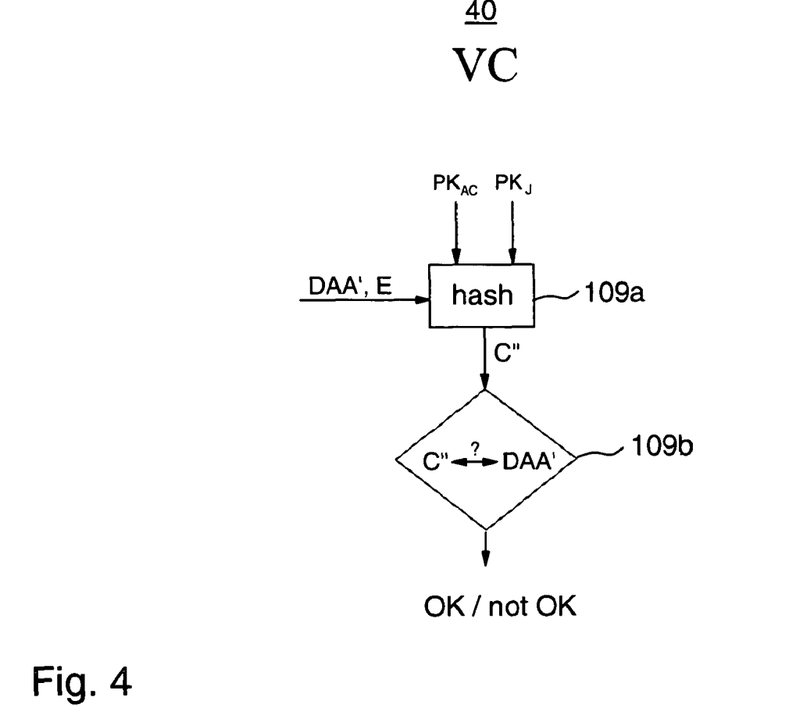
FIG. 4 shows a schematic flow of a more detailed verification of the encryption E and the user attestation-signature value DAA' by the verification computer.

FIG. 4 shows a schematic flow of a more detailed verification of the encryption E and the user attestation-signature value DAA' by the verification computer 40. The verification computer 40 computes under use of a hash function a first verification value C" by using the user attestation-signature value DAA', the encryption E, the attester public key $PK_{AC}$, and the trusted-entity public key $PK_J$, as indicated with step 109a, and checks, as indicated with step 109b, whether or not the first verification value C" is comprised in the user attestation-signature value DAA'. It turns out either "OK" or "not OK", i.e., either the verification is valid or not.

Figure 5:
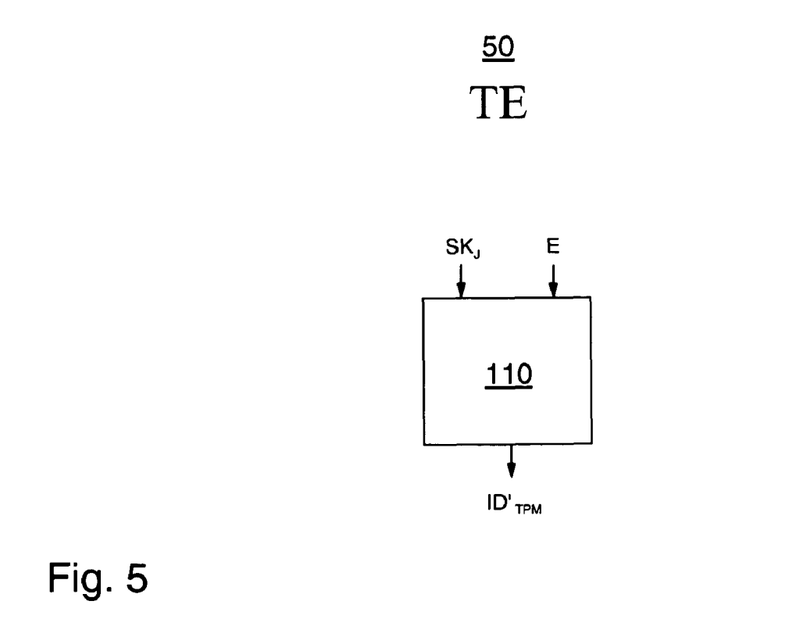
FIG. 5 shows a schematic derivation by the trusted entity of the module-generated-identifier value from the encryption E by applying a trusted entity secret key.

FIG. 5 indicates the derivation of the module-generated-identifier value $ID'_{TPM}$ by the trusted entity 50. For that the trusted entity 50 derives by applying the trusted entity secret key $SK_J$ the module-generated-identifier value $ID'_{TPM}$ in step 110 from the encryption E. The derived module-generated-identifier value $ID'_{TPM}$ is then usable to identify the user computer 20 with the security module 22, as described above.

The above description is now supported by a more detailed implementation. More precisely, the attester public key $PK_{AC}$ of the attester computer 30 comprises the values $(n,g,g',h,S, Z,R_0,R_1,\Gamma,\gamma,\rho)$. The trusted-entity public key $PK_J$ and secret key $SK_J$ pair could be one of the Cramer-Shoup encryption scheme, i.e., the public key consists of the values $(\eta:=\gamma^w \bmod \Gamma, \lambda_1:=\gamma^{x1}\eta^{x2} \bmod \Gamma, \lambda_2:=\gamma^{x3}\eta^{x4} \bmod \Gamma, \lambda_3:=\gamma^{x5} \bmod \Gamma)$ and the secret key of the values x1, x2, x3, x4, and x5. The Cramer-Shoup encryption scheme is described by R. Cramer and V. Shoup in "A Practical Public Key Cryptosystem Provably Secure Against Adaptive Chosen Ciphertext Attack", Advances in Cryptology—CRYPTO '98, vol. 1642, 1998, Springer Verlag, Berlin.

To obtain an attestation value cert from the attester computer 30, the user computer 20, hereafter also referred to as platform 20, first sends a base value z to the security module 22, hereafter referred to as TPM 22, receives values U and Nv from it, and sends them to the attester computer 30. Here Nv represents the module-generated-identifier value $ID'_{TPM}$.

The attester computer 30, hereafter also referred to as attester 30, stores Nv with the TPM/platform's identity. Then the attester computer 30 chooses a random prime e of suitable size and a random integer v''', and computes $A=(Z/(U \cdot S^{v'''}))^{1/e} \bmod n$ representing a first part of the attestation value cert. The attestation value cert comprises here the values A, e, v'''. When the platform 20 intends to anonymously prove attestation to a verifier, that is the verification computer 40, such that later on a trusted third party, that is the trusted entity 50, will be able to revoke anonymity (i.e., to identify the TPM/platform), it proceeds as follows: Let m be a text or a value derived from such a text describing the condition under which anonymity is revocable. To m is also referred as decryption policy.

The platform 20 first sends the base value z and receives the value Nv from the TPM 22. In FIG. 3 is this illustrated by steps 101 and 102, but $ID'_{TPM}$ is labeled for Nv. Then it chooses a random integer u and computes a part of the user attestation-signature value DAA'

$$T_1 = A \cdot h^u \bmod n.$$

Next, it chooses a random integer r between 0 and p and computes an encryption E with the following four values $$\delta1 = \gamma^r \bmod \Gamma, \delta2 = \eta^r \bmod \Gamma, \delta3 = \lambda_3^r Nv \bmod \Gamma, \text{ and } \delta4 = \lambda_1^r \lambda_2^{r \cdot H(\delta1,\delta2,\delta3,m)} \bmod \Gamma.$$

The platform 20 then sends $T_1$ and $E=(\delta1, \delta2, \delta3, \delta4)$ to the verifier 40. Then it receives a first signature value $T'_1$ from the TPM 22 and computes an intermediary user attestation-signature value $$T''_1 = T'_1 \cdot A^{re} \cdot h^{reu} \bmod n,$$

where re and reu are random integers. Next, the platform 20 chooses a random integer rτ between 0 and ρ and computes an encryption proof value E' with the following four values $$\delta1' = \gamma^{r\tau} \bmod \Gamma, \delta2' = \eta^{r\tau} \bmod \Gamma, \delta3' = \lambda_3^{r\tau} Nv \bmod \Gamma, \text{ and}$$
$$\delta4' = \lambda_1^{r\tau} \lambda_2^{r \cdot H(\delta1,\delta2,\delta3,m)} \bmod \Gamma.$$

The platform 20 then uses $T''_1$ and $E'=(\delta1', \delta2', \delta3', \delta4')$ as well as some other values as input to a hash function, e.g. SHA-1, to derive a value C', herein also referred to as intermediate user attestation-signature value C'. The platform 20 sends C' to the TPM 22 and receives the security module attestation value DAA comprising values (C,sf0,sf1,sv). The platform 20 augments these security module attestation with at least the values sτ=rτ+C·τ, se=re+C·e, and seu=reu+C·e·r and sends a resulting list of values DAA', also referred to as user attestation-signature value DAA', to the verifier 40.

The received user attestation-signature value DAA' can be verified by the verifier 40 by computing an intermediary user attestation-signature verification value $$T'''_1 = (T'_1(R_2^x \cdot R_5^z))^{-C} \cdot S^{sv} \cdot R_0^{sf0} \cdot R_1^{sf1} \cdot T_1^{se-CL} \cdot h^{-seu} \cdot R_3^{sy} \cdot R_4^{sw} \bmod n,$$

where L is a security parameter, and computing encryption-proof verification values $$\delta1''' = \delta1^{-C} \gamma^{s\tau} \bmod \Gamma, \delta2''' = \delta2^{-C} \eta^{s\tau} \bmod \Gamma,$$
$$\delta3''' = \delta3^{s\tau} z^{sf0+L'sf2} \bmod \Gamma, \text{ and } \delta4''' = \delta3^{-C} \lambda_1^{s\tau} \lambda_2^{s\tau \cdot H(\delta1,\delta2,\delta3,m)} \bmod \Gamma,$$

where L' is a further security parameter, using $T'''_1, \delta1''', \delta2''', \delta3''', \delta4'''$ in the input to the hash function to derive the first verification value C''', and verifying whether C''' equals the value C comprised in the user attestation-signature value DAA'.

When later anonymity is desired to be revoked, the verifier 40 can forward the encryption E with the encryption values $(\delta1, \delta2, \delta3, \delta4)$ together with the decryption policy m. The trusted third party, i.e. the trusted entity 50, verifies the decryption policy m, i.e., whether it is justified to revoke the anonymity. If this is the case, it next verifies the following congruencies:

$$\delta1^{x1+x3H(\delta1,\delta2,\delta3,m)} \delta2^{x2+x4H(\delta1,\delta2,\delta3,m)} = \delta4 \bmod \Gamma \text{ and}$$
$$\delta2 = \delta1 \bmod \Gamma.$$

If they hold, the trusted third party 50 computes $$Nv = \delta3/\delta1^{x5} \bmod \Gamma.$$

This value will then allow one to identify the TPM/platform as it is known to the issuer which TPM/platform corresponds to which value of Nv.

In a further embodiment, the trusted third party 50 could make available a public key of the Camenisch-Shoup encryption scheme, i.e., values $(n, g, y1=g^{x1}, y2=g^{x2}, y3=g^{x3})$, where g, y1, y2, y3 are values from $Zn^2$ and are the secret key of the trusted third party 50. The Camenisch-Shoup encryption scheme is described by J. Camenisch and V. Shoup in the article "Practical Verifiable Encryption and Decryption of Discrete Logarithms", Advances in Cryptology—{CRYPTO 2003}, pp. 126-144, vol. 2729, 2003. Moreover, the issuer makes available besides the values $(n, g, g', h, S, Z, R_0, R_1, \Gamma, y, \rho)$ a further value $R_2$ in his public key.

In this setting, the issuer computes the attestation value cert or certificate as follows. The issuer first chooses a random prime e of suitable size and a random integer v", and computes $$A = (Z/(U \cdot R_2^{IDtpm} \cdot S^{v''}))^{1/e} \bmod n,$$

where IDtpm is a value identifying the TPM/platform, i.e., the identifying value $ID_{TPM}$ for the user computer 20 with security module 22.

When now the platform 20 wants to anonymously prove attestation to the verifier 40 such that later on one trusted third party 50 should be able to revoke anonymity (i.e., to identify the TPM/platform), it proceeds as follows:

Let m be a text or a value derived from such a text describing the condition under which anonymity may be revoked. To m is also referred as decryption policy.

The platform 20 first receives value Nv from the TPM 22, where here Nv represents the module-generated-identifier value $ID'_{TPM}$. Then it chooses a random integer u and computes $$T_1 = A \cdot h^u \bmod n.$$

Next, it chooses a random integer $\tau$ between 0 and n/4 and computes encryption values $$u := g^\tau \bmod n^2, \; e := y1^\tau h^{IDtpm} \bmod n^2, \text{ and } v := abs\,(y2 y3^{H \cdot (u,e,\ldots m \ldots)})^\tau \bmod n^2,$$

where abs( ) is a function that maps (a mod $n^2$) to ($n^2$–a mod $n^2$) if a>$n^2$/2, and to (a mod $n^2$), otherwise, where 0<a<$n^2$.

The platform 20 then sends $T_1$ and encryption values (u,e,v) to the verifier 40. Then it receives the first signature value T', from the TPM 22 and computes $$T''_1 = T'_1 \cdot A^{re} \cdot R_2^{rt} \cdot h^{reu} \bmod n,$$

where re, rt and reu are random integers. Next, the platform 20 chooses a random integer $r\tau$ between 0 and n/4 and computes $$u' := g^{2 \cdot r\tau} \bmod n^2, \; e' := y1^{2 \cdot r\tau} h^{2 \cdot rt} \bmod n^2, \text{ and } v' := y2^2 y3^{2 \cdot H(u,e,m) \cdot r\tau} \bmod n^2.$$

The platform 20 then uses $T''_1$ and (u',e',v') as well as some other values as input to the hash function to derive the intermediate user attestation-signature value C'. The platform 20 sends C' to the TPM 22 and receives the security module attestation values DAA that comprises values (C,sf0,sf1,sv). The platform 20 augments these security module attestation with at least the values $s\tau = r\tau + C \cdot \tau$, st=rt+C·IDtpm, se=re+C·e, and seu=reu+C·e·u and sends the resulting list of values, that is the user attestation-signature value DAA', to the verifier 40.

The received user attestation-signature value DAA' can be verified by the verifier 40 by computing $$T'''_1 = (T'_1/(R_2^x \cdot R_5^z))^{-C} \cdot S^{sv} \cdot R_0^{sf0} \cdot R_1^{sf1} \cdot R_2^{st} \cdot T_1^{se-CL} \cdot h^{-seu} \cdot R_3^{sy} \cdot R_4^{sw} \bmod n,$$

where L is a security parameter, and computing values $$u''' := g^{2 \cdot s\tau} \bmod n^2, \; e''' := y1^{2 \cdot s\tau} h^{2 \cdot st} \bmod n^2, \text{ and } v''' = y2^2 y3^{H(u,e,m) \cdot 2 \cdot s\tau} \bmod n^2.$$

using $T'''_1$ and (u''',e''',v''') in the input to the hash function to derive the first verification value C", and verifying whether C" equals the value C comprised in the user attestation-signature value DAA'.

When later anonymity is intended to be revoked, the verifier 40 can forward the encryption values (u,e,v) together with the decryption policy m. The trusted third party 50 verifies the decryption policy, i.e., whether it is justified to revoke the anonymity. If this is the case, it next verifies the following congruencies:

$$abs(v) = v \text{ and } u^{2(x2 + H(u,e,m)x3)} = v^2,$$

and, if they hold, computes $t = 2^{-1} \bmod n$, and compute ID':= $(e/u^{x1})^{2t}$. If n divides ID'–1, then the trusted third party 50 outputs IDtpm=(ID'–1)/n. If any of the checks fail, it outputs "failure". The value IDtpm, that is the identifying value IDtpm, will then allow one to identify the TPM/platform directly.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Program code in the present context mean any expression, in any language, transcription or notation, of a set of instructions intended to cause a system having an information processing capability to perform a particular function either directly or after either or both of the following a) conversion to another language, code or notation; b) reproduction in a different material form.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for enabling a trusted entity to identify a user computer with a security module within a system comprising further an attester computer and a verification computer, the method comprising at the user computer the steps of:
   receiving from the attester computer an attestation value, the attestation value being derived from a security module public key and an identifying value of the security module;
   deriving under use of the security module and using a hash function, a user attestation-signature value from the attestation value;
   computing an encryption by the user computer under use of a trusted-entity public key and a module-generated-identifier value, said module-generated-identifier value relating to the identifying value; and
   providing the user attestation-signature value and the encryption to the verification computer for verification, wherein the trusted entity having a trusted entity secret key is able to derive the module-generated-identifier value from the encryption, said module-generated-identifier value being usable to identify the user computer with the security module.

2. The method according to claim 1, wherein the step of deriving the user attestation-signature value further comprises the steps of receiving from the security module the module-generated-identifier value, and deriving the encryption and encryption random values from the module-generated-identifier value under the use of the trusted-entity public key.

3. The method according to claim 2, further comprising the steps of:
   receiving from the security module a second module-generated-identifier value, and deriving an encryption proof value and encryption proof random values from the second module-generated-identifier value under the use of the trusted-entity public key.

4. The method according to claim 3 further comprising the steps of:
   deriving an intermediary user-attestation signature value from the encryption and the encryption proof value under use of a hash function, providing the intermediate user attestation-signature value to the security module;
   receiving from the security module a first part of the user attestation-signature value, and calculating by the user computer further parts of the user attestation-signature value by using the received first part of the user attestation-signature value, the encryption random values, the encryption proof random values, the attester public key, and the trusted-entity public key.

5. The method according to claim 1, further comprising billing the user computer with the security module when the trusted entity derived the module-generated-identifier value from the encryption, wherein the derived module-generated-identifier value identifies the user computer with the security module.

6. A method for enabling a trusted entity to identify a user computer with a security module within a system comprising further an attester computer and a verification computer, the method comprising at the trusted entity the steps of:
   providing a trusted-entity public key; receiving an encryption computed by the user computer under use of the trusted-entity public key, wherein the encryption comprises a module-generated-identifier value relating to an identifying value which together with a security module public key was used by the attester computer to generate an attestation value; and
   deriving the module-generated-identifier value from the encryption by applying a trusted entity secret key, the derived module-generated-identifier value being usable to identify the user computer with the security module.

7. The method according to claim 6, further comprising the steps of:
   sending the derived module-generated-identifier value to the attester computer, and in response to the sent derived module-generated-identifier value receiving the related identifying value identifying the user computer with the security module.

8. A method for verifying a user attestation-signature value by a verification computer within a system in which an identity of a user computer with a security module is identifiable by a trusted entity, the system comprising an attester computer, the method comprising at the verification computer the steps of:
   receiving the user attestation-signature value and an encryption for verification, the encryption having been computed by the user computer under use of a trusted-entity public key and a module-generated-identifier value that relates to an identifying value which together with a security module public key was used by the attester computer to generate an attestation value, wherein the user computer under use of the security module derived the user attestation-signature value from the attestation value, wherein the trusted entity having a trusted entity secret key is able to derive the module-generated-identifier value from the encryption, the derived module-generated-identifier value being usable to identify the user computer with the security module; and
   verifying the validity of the received user attestation-signature value and the encryption.

9. Method according to claim 8, wherein the step of verifying further comprises computing a first verification value by using the user attestation-signature value, the attester public key, the trusted-entity public key, the encryption, and a hash-function, and checking whether or not the first verification value is comprised in the user attestation-signature value.

10. A method for enabling identification of a user computer with a security module by a trusted entity within a system comprising further an attester computer and a verification computer, the method comprising at the attester computer the steps of:

deriving an attestation value from a security module public key and an identifying value;

providing the attestation value to the user computer which under use of the security module is able to derive a user attestation-signature value from the attestation value and to compute an encryption under use of a trusted-entity public key and a module-generated-identifier value, the module-generated-identifier value relating to the identifying value, the user attestation-signature value and the encryption being verifiable by the verification computer, wherein the trusted entity having a trusted entity secret key is able to derive the module-generated-identifier value from the encryption, the module-generated-identifier value being usable to identify the user computer with the security module.

11. The method according to claim 10, further comprising billing the user computer with the security module for the provided attestation value that relates to a service.

12. The method according to claim 10, further comprising billing the trusted entity for providing upon request one identifying value.

13. A computer program product stored on a non-transitory computer usable medium, comprising computer readable program code for causing a computer to perform the method according to claim 1.

14. A network for enabling identification a user computer by a trusted entity, comprising:

an attester computer that provides an attestation value from a security module public key and an identifying value;

a user computer having a security module that provides the module public key and a security module attestation value, the user computer providing a user public key, a user attestation-signature value derived from the attestation value, and an encryption computable under use of a trusted-entity public key and a module-generated-identifier value, the module-generated-identifier value relating to the identifying value;

a verification computer for verifying the validity of the received user attestation-signature value and the encryption; and a trusted entity having a trusted entity secret key, wherein the trusted entity is able to derive the module-generated-identifier value from the encryption, the module-generated-identifier value being usable to identify the user computer with the security module.

15. An article of manufacture comprising a non-transitory computer usable medium having computer readable program code means embodied therein for causing enablement of a trusted entity to identify a user computer, the computer readable program code means in said article of manufacture comprising computer readable program code means for causing a computer to effect the steps of claim 1.

16. An article of manufacture comprising a non-transitory computer usable medium having computer readable program code means embodied therein for causing enablement of a trusted entity to identify a user computer, the computer readable program code means in said article of manufacture comprising computer readable program code means for causing a computer to effect the steps of claim 6.

17. A non-transitory program storage device readable by machine, tangibly embodying a program of instructions executable by the machine to perform method steps for verifying a user attestation-signature value, said method steps comprising the steps of claim 8.

18. A non-transitory program storage device readable by machine, tangibly embodying a program of instructions executable by the machine to perform method steps for enabling identification of a user computer, said method steps comprising the steps of claim 10.

19. A computer program product comprising a non-transitory computer usable medium having computer readable program code means embodied therein for causing functions of a network for enabling identification a user computer, the computer readable program code means in said computer program product comprising computer readable program code means for causing a computer to effect the functions of claim 14.

\* \* \* \* \*